US008571044B2

(12) United States Patent
Ihle et al.

(10) Patent No.: US 8,571,044 B2
(45) Date of Patent: Oct. 29, 2013

(54) GATEWAY FOR DATA TRANSFER BETWEEN SERIAL BUSES

(75) Inventors: Markus Ihle, Jettenburg (DE); Tobias Lorenz, Schwieberdingen (DE); Jan Taube, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 12/227,386

(22) PCT Filed: Apr. 17, 2007

(86) PCT No.: PCT/EP2007/053728
§ 371 (c)(1),
(2), (4) Date: Jun. 19, 2009

(87) PCT Pub. No.: WO2007/134920
PCT Pub. Date: Nov. 29, 2007

(65) Prior Publication Data
US 2009/0268744 A1    Oct. 29, 2009

(30) Foreign Application Priority Data

May 24, 2006   (DE) .......................... 10 2006 024 888
Nov. 24, 2006  (DE) .......................... 10 2006 055 514

(51) Int. Cl.
*H04L 12/28*    (2006.01)
*H04L 12/56*    (2011.01)
*H04Q 11/00*   (2006.01)

(52) U.S. Cl.
USPC ........... 370/401; 370/364; 370/402; 710/110; 710/316

(58) Field of Classification Search
USPC .......... 370/411–419, 352–402; 710/106–110, 710/306–316; 713/501–503; 701/1–29
See application file for complete search history.

(56) References Cited

U.S. PATENT DOCUMENTS

| 5,596,578 | A  | * | 1/1997  | Cunningham ................ 370/364 |
| 5,765,216 | A  | * | 6/1998  | Weng et al. .................. 711/214 |
| 6,157,971 | A  | * | 12/2000 | Gates ............................ 710/100 |
| 6,430,631 | B1 | * | 8/2002  | He et al. ......................... 710/52 |
| 6,487,617 | B1 | * | 11/2002 | Gates ............................ 710/100 |
| 6,526,518 | B1 | * | 2/2003  | Catlin et al. ................. 713/501 |
| 6,816,940 | B2 | * | 11/2004 | Brooks et al. ................ 710/308 |

(Continued)

FOREIGN PATENT DOCUMENTS

| JP | 59108129 | 6/1984 |
| JP | 3177953  | 8/1991 |

(Continued)

Primary Examiner — M. Phan
(74) Attorney, Agent, or Firm — Kenyon & Kenyon LLP

(57) ABSTRACT

A gateway for data transfer between serial buses, including multiple communication modules that are each provided for connection of one serial bus, and that carry out a conversion between data packets and data words, a bus master that, via an internal control bus, controls a word-based transfer of data via an internal data bus between two communication modules, the bus master applying a source address via a source address bus to an internally transmitting first communication module, and a destination address via a separate destination address bus to an internally receiving second communication module, data received in data packets by the first communication module via a first serial bus connected thereto being transferred from the first communication module directly without buffering, in word-based fashion in one or more data words, via the internal data bus to the second communication module, which delivers these transferred data, in data packets, via a second serial bus connected to the second communication module.

30 Claims, 3 Drawing Sheets

(56) References Cited

U.S. PATENT DOCUMENTS

| | | | |
|---|---|---|---|
| 7,340,551 B2 * | 3/2008 | Elliott et al. | 710/309 |
| 7,350,015 B2 * | 3/2008 | Barrenscheen et al. | 710/311 |
| 7,590,764 B2 * | 9/2009 | Rooney | 710/5 |
| 7,907,623 B2 * | 3/2011 | Ihle et al. | 370/402 |
| 8,171,199 B2 * | 5/2012 | Ihle et al. | 710/316 |
| 8,301,821 B2 * | 10/2012 | Ihle et al. | 710/315 |
| 2009/0225766 A1 * | 9/2009 | Ihle et al. | 370/402 |
| 2009/0292844 A1 * | 11/2009 | Ihle et al. | 710/110 |
| 2010/0064082 A1 * | 3/2010 | Ihle et al. | 710/106 |

FOREIGN PATENT DOCUMENTS

| | | |
|---|---|---|
| JP | 5113954 | 5/1993 |
| WO | 98/53404 | 11/1998 |
| WO | 00/07335 | 2/2000 |

\* cited by examiner

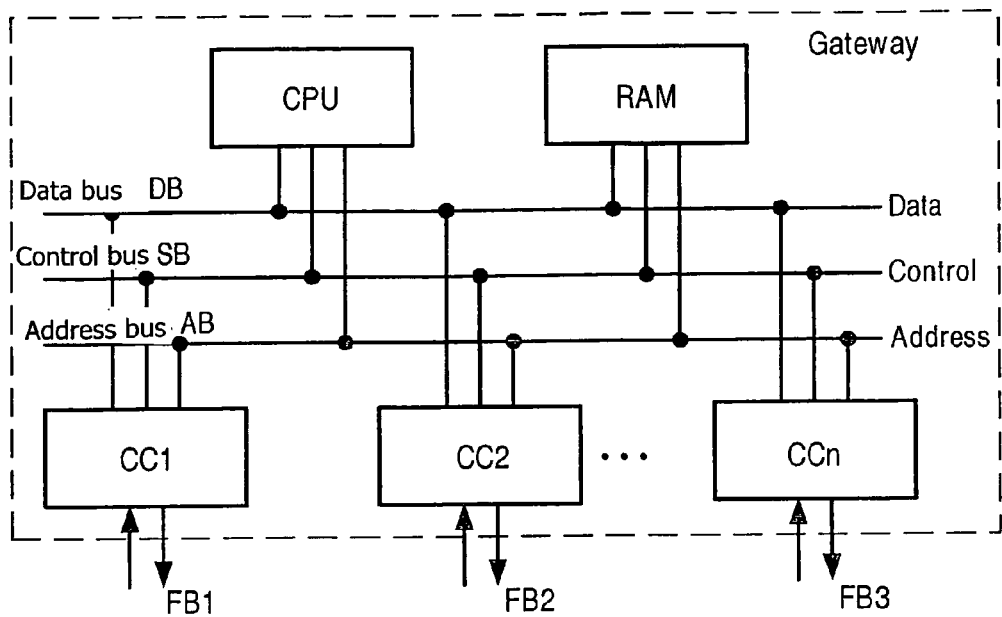
Fig. 1 Existing Art
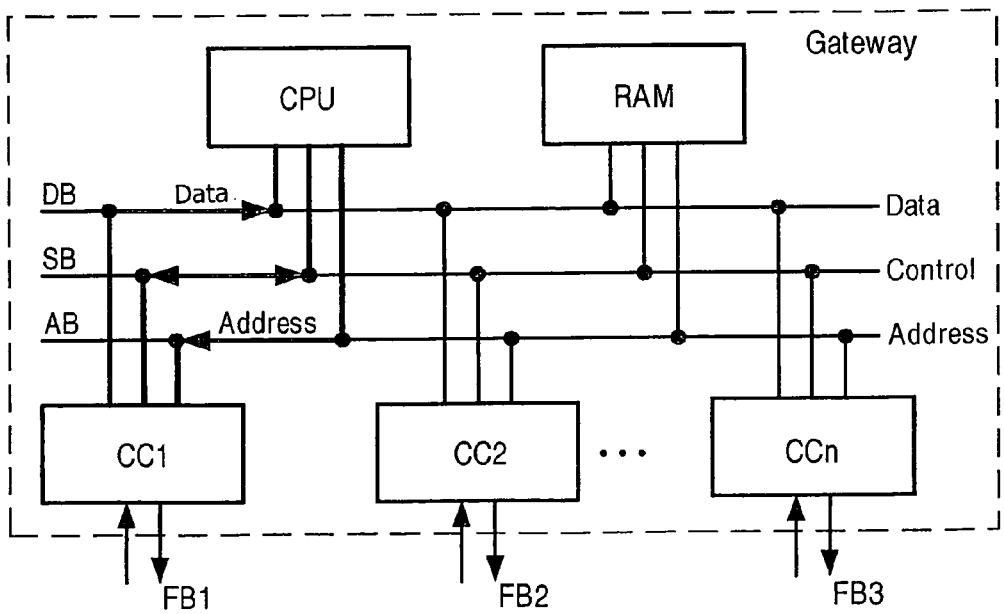
Fig. 2 Existing Art

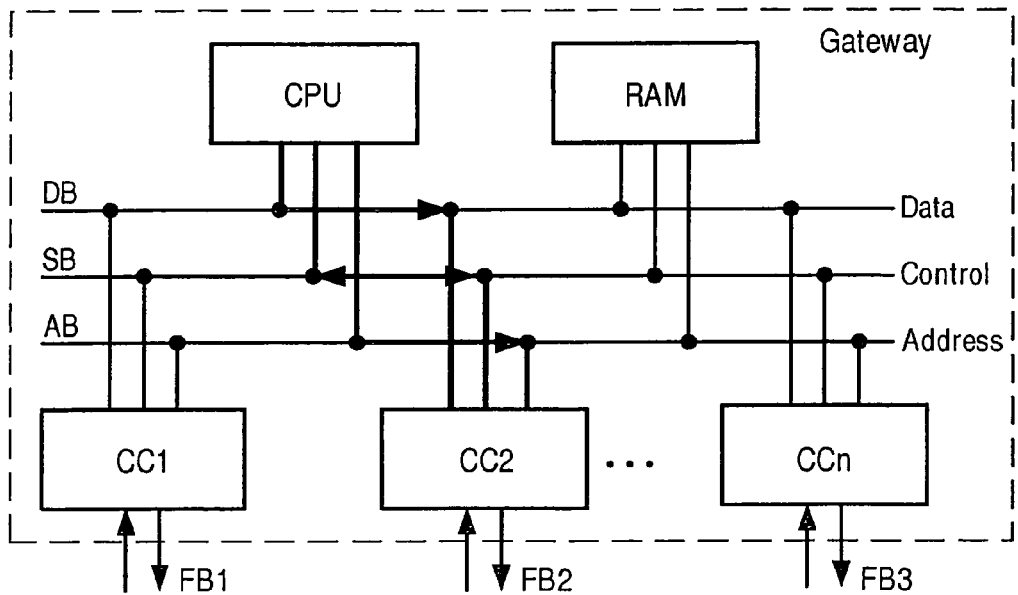
Fig. 3 Existing Art
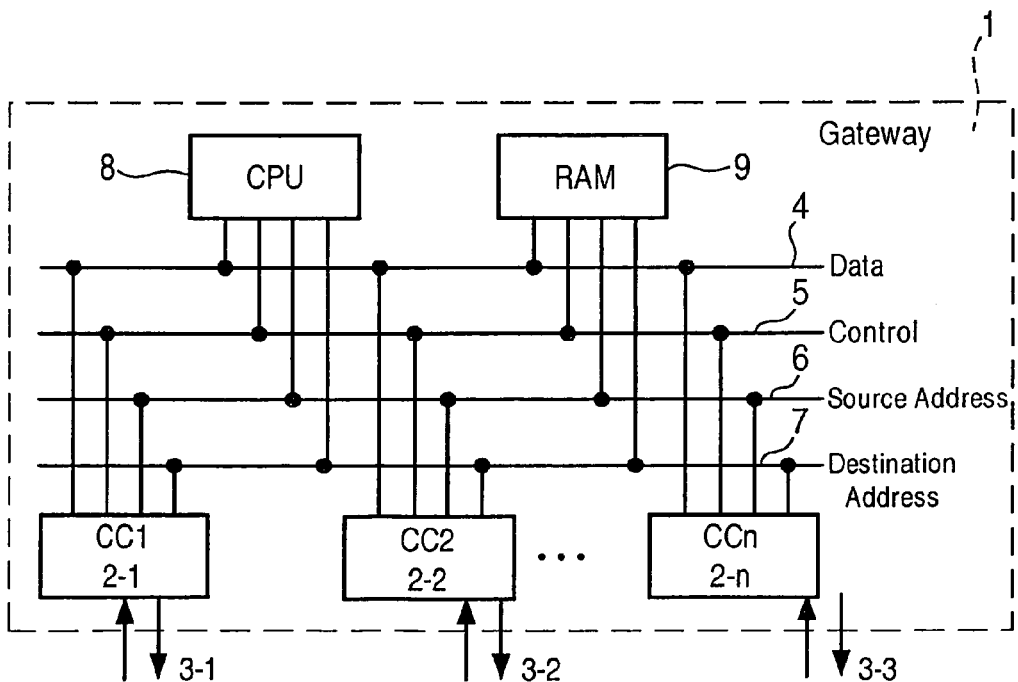
Fig. 4

GATEWAY FOR DATA TRANSFER BETWEEN SERIAL BUSES

FIELD OF THE INVENTION

The present invention relates to a gateway for data transfer between serial buses, in particular between field buses.

BACKGROUND INFORMATION

The networking of control units, sensor apparatus, and actuators with the aid of a network or communication system made up of a communication connection, in particular a bus, and corresponding communication modules, has drastically increased in recent years in the design of modern motor vehicles or also in mechanical engineering, especially in the machine-tool sector, and in automation. Synergistic effects resulting from the distribution of functions to multiple users, in particular control units, can be achieved in this context. The term used is "distributed systems." Such distributed systems or networks are thus made up of the users and the bus system or multiple bus systems connecting those users. Communication between different stations or users is thus taking place more and more via a communication system, bus system, or network of this kind, over which the data to be transferred are transmitted in messages. This communication traffic on the bus system, access and receiving mechanisms, and error handling are regulated by a corresponding protocol, the name of the respective protocol often being used (as it also is here) as a synonym for the network or bus system itself.

In the automotive sector, for example, the controller area network (CAN) bus has become established as a protocol. This is an event-controlled protocol, i.e. protocol activities such as the sending of a message are initiated by events that originate outside the communication system. Unique access to the communication system or bus system is resolved by priority-based bit arbitration. A prerequisite for this is that a priority be assigned to the data being transferred, and thus to each message. The CAN protocol is very flexible, and it is thus easy to insert further users and messages as long as free priorities (message identifiers) still exist. The totality of all the messages to be sent in the network, with priorities and with their transmitting and receiving users and the corresponding communication modules, are stored in a list called the communication matrix.

An alternative approach to event-controlled, spontaneous communication is the exclusively time-controlled approach. All communication activities on the bus are strictly periodic. Protocol activities such as the sending of a message are triggered only by the passage of a time that applies to the bus system. Access to this medium is based on the apportioning of time regions in which a transmitter has an exclusive transmission right. As a rule, the message sequence must already be defined before initial startup. A schedule is therefore drawn up that meets the messages' requirements in terms of repetition rate, redundancy, deadlines, etc. This is called a "bus schedule." One such bus system is, for example, TTP/C.

The advantages of both aforesaid bus types are combined in the time-controlled CAN approach, called TTCAN (time-triggered controller area network). This meets the requirements outlined above for time-controlled communication, and the requirements for a certain degree of flexibility. TTCAN achieves this by constructing the communication round in "exclusive" time windows for periodic messages of specific communication users, and in "arbitrating" time windows for spontaneous messages of multiple communication users. TTCAN is based substantially on a time-controlled, periodic communication that is timed, with the aid of a time-reference message, by a user or communication module (called the "time master") that defines the principal time.

A further possibility for combining different transfer types is offered by the FlexRay protocol, which describes a fast, deterministic, and fault-tolerant bus system for use in particular in a motor vehicle. This protocol operates with the time division multiple access (TDMA) method, in which the users and the messages to be transferred are allocated fixed time slots in which they have exclusive access to the communication connection (the bus). The time slots repeat in a defined cycle, so that the point in time at which a message is transferred via the bus can be predicted exactly, and bus access occurs deterministically. For optimum utilization of the bandwidth for message transfer on the bus system, the cycle is subdivided into a static and a dynamic part. The fixed time slots are located in the static part at the beginning of a bus cycle. In the dynamic part, the time slots are assigned dynamically, and exclusive bus access therein is enabled for only a short time in each case. If no access occurs, access is authorized for the next user. This time span is referred to as a "mini-slot," in which the system waits for access by the first user.

As just presented, a plurality of different transfer technologies, and therefore types of bus systems or networks, exist. It is often the case that multiple bus systems of the same or different types must be connected to one another. This purpose is served by a bus interface unit, called a "gateway." A gateway is therefore an interface between different buses, which can be of the same or different types: the gateway forwards messages from one bus to one or more other buses. Known gateways are made up of multiple independent communication modules; the exchange of messages occurs via the processor interface (CPU interface) of the respective user or the corresponding interface module of the respective communication module. This CPU interface is heavily loaded by this data exchange in addition to the messages to be transferred to the user itself; in combination with the transfer structure resulting therefrom, this results in a relatively low data transfer speed. Integrated communication controllers or communication modules, which share a common message memory (also called message RAM) in order thereby to compensate for structural disadvantages, also exist.

FIG. 1 shows a gateway according to the existing art. The gateway contains multiple communication modules or communication controllers (CC), each of which is provided for connection of one serial bus. Data are transferred in packet fashion via the serial buses. The gateway contains an internal system bus for internal data transfer, the internal system bus encompassing a data bus DB, a control bus SB, and an address bus AB. Also connected to the system bus, in addition to the various communication modules CC, are a data processing unit CPU, data memory RAM, and further optional components. The CPU configures, monitors, and controls the individual communication modules CC. On internal data bus DB, data are transferred in word-based fashion between the various units. The number of data bits transferred in one data word corresponds to the bus width of data bus DB.

In the conventional gateway as depicted in FIG. 1, the CPU reads received messages, processes them, and generates new messages. The CPU also handles the delivery of messages. In simple gateway operations, received data are read out from a communication module CC and written into another, or several further, communication modules CC for delivery. If a DMA controller is not used, the host CPU transfers the data in word-based fashion from the communication modules CC into the data memory RAM or into a CPU-internal memory, in order to process the data and then copy them into the corresponding communication modules CC. The data memory RAM contains not only the transferred data but also a region for storing the program to be executed by the CPU.

Communication modules CC represent the connection from the gateway to the individual serial bus systems. These communication modules CC exchange data packets, which contain headers or administrative data and useful or payload data, with the serial data buses. In addition, communication modules CC have an interface to the system bus, i.e. to the control, data, and address buses. The host CPU can access, via a passive interface, a message memory contained respectively in communication module CC. The internal system bus, which encompasses data bus DB, control bus SB, and address bus AB, is connected to all the communication modules CC of the gateway. Data bus DB is made up of data lines from [sic] which data are transferred from one unit connected to the bus to another unit. The CPU controls data transfer by way of control bus SB. Address bus AB serves for selection of the data that are read out from a communication module CC or written into a communication module. The CPU receives or sends data by way of an internal CPU data register.

FIGS. 2 and 3 illustrate the execution of a data transfer in a conventional gateway according to the existing art. In the example depicted in FIGS. 2 and 3, data are being transferred from a serial field bus FB1 to a serial field bus FB2. What first happens, as depicted in FIG. 2, is a read access by the CPU to communication module CC1, which is connected to serial bus FB1. The CPU selects the data to be read by applying an address via address bus AB, and delivering the corresponding control signals to control bus SB. Communication module CC1 receives data (packaged in data packets DP) via serial field bus FB1, delivers the selected data, in one or more data words DW, onto internal data bus DB, and signals this to the status lines of control bus SB that correspond to the CPU. The CPU picks up the data pending on data bus DB, and stores them in an internal register of the CPU. The control signals on control bus DB are then reset.

In a second phase, the data transferred into the CPU register are then transferred to second communication module CC2. In the second bus transfer, the data read out from communication modules 1 are transferred out of the CPU's internal register to second communication module CC2. For this, the CPU applies the data to be transferred to data bus DB, and selects the corresponding destination address of the second communication module. The CPU then starts the data transfer by setting corresponding control lines of control bus SB. Second communication module CC2 picks up the data applied to the data bus, and signals this to the CPU once again by way of status lines of control bus SB. The CPU then resets the control lines, data lines, and address lines. Second communication module CC2 also resets the control signals on the status lines.

As may be gathered from FIGS. 2 and 3, in a conventional gateway a data transfer from a first field bus FB1 to a second field bus FB2 takes place in two phases, namely in a read operation in which data are read out by the CPU from first communication module 1, and in a write operation in which the read-out data are then written into second communication module CC2.

A disadvantage with the conventional procedure for transferring data with the conventional gateway according to the existing art depicted in FIG. 1 is that a data transfer between two serial field buses FB1, FB2 takes a relatively long time, and that the latency time required for the data transfer is relatively long. A further disadvantage of the conventional gateway is that the data transfer occurs via the CPU, i.e. the CPU experiences a load in the context of the data transfer, and cannot carry out any other data processing operations during that time.

SUMMARY OF THE INVENTION

It is therefore an object of the exemplary embodiments and/or exemplary methods of the present invention to create a gateway for data transfer between serial buses that exhibits very short latency times for a data transfer between serial buses.

This object is achieved, according to the exemplary embodiments and/or exemplary methods of the present invention, by a gateway having the features described herein.

The exemplary embodiments and/or exemplary methods of the present invention creates a gateway for data transfer between serial buses having:
  multiple communication modules that are each provided for connection of one serial bus, and that carry out a conversion between data packets and data words;
  a bus master that, via an internal control bus, controls a word-based transfer of data via an internal data bus between two communication modules,
the bus master applying a source address via a source address bus to an internally transmitting first communication module, and a destination address via a separate destination address bus to an internally receiving second communication module, data received in data packets by the first communication module via a first serial bus connected thereto being transferred from the first communication module directly without buffering, in word-based fashion, via the internal data bus to the second communication module, which delivers these transferred data, in data packets, via a second serial bus connected to the second communication module.

In an embodiment, the serial buses are made up of field buses FB.

In an embodiment of the gateway according to the present invention, the serial bus is an Ethernet bus.

In an embodiment of the gateway according to the present invention, the bus master is constituted by a processor.

In an embodiment of the gateway according to the present invention, the bus master is a DMA controller.

In an embodiment of the gateway according to the present invention, the bus master is a finite state machine (FSM).

In an embodiment of the gateway according to the present invention, direct data transfer from the first communication module to the second communication module occurs within a single clock cycle.

In an embodiment of the gateway according to the present invention, actuators and sensors are respectively connected to the serial buses.

In an embodiment of the gateway according to the present invention, the internal data bus has multiple parallel data lines for transfer of a data word.

Exemplary embodiments of the gateway according to the present invention are described hereinafter, with reference to the appended Figures in order to explain features of the present invention.

BRIEF DESCRIPTION OF THE FIGURES

FIG. 1 shows a block diagram of a gateway according to the existing art.

FIG. 2 shows a block diagram of a gateway, to explain an internal read operation in the context of the conventional gateway as shown FIG. 1.

FIG. 3 shows a block diagram depicting an internal write operation in the context of the conventional gateway according to the existing art as shown in FIG. 1.

FIG. 4 shows a block diagram of an embodiment of the gateway according to the present invention.

DETAILED DESCRIPTION

Figure 5:
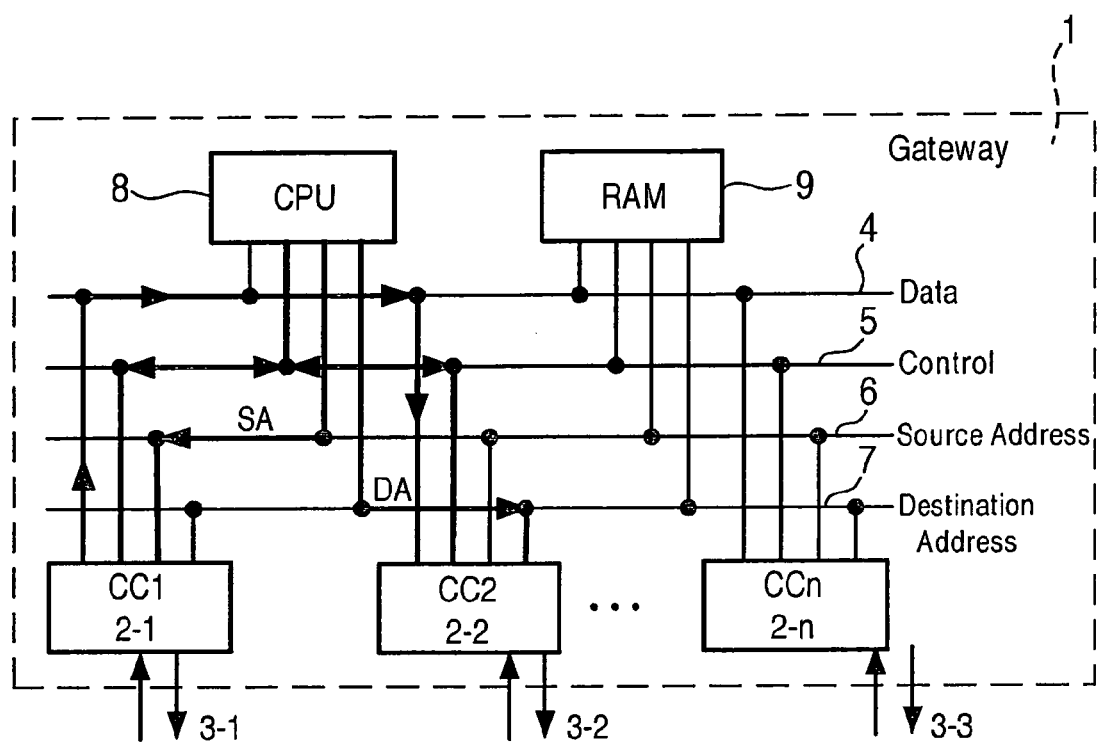
FIG. 5 shows a block diagram to explain a data transfer in the context of the gateway according to the present invention depicted in FIG. 4.

FIG. 4 shows a specific embodiment of gateway 1 according to the present invention for data transfer between different serial buses. Gateway 1 has multiple communication modules 2 that are each provided for connection of one serial bus 3. Serial buses 3 can be, for example, field buses. Alternatively, the serial buses can also be Ethernet buses. Possible serial field buses are a CAN bus, a FlexRay bus, a MOST bus, or a LIN bus. Data are transferred via serial buses 3-$i$ in packet fashion, the transferred data packets encompassing administrative or header data, and useful or payload data.

The gateway according to the exemplary embodiments and/or exemplary methods of the present invention has an internal system bus that encompasses an internal data bus 4, an internal control bus 5, a source address bus 6, and a destination address bus 7. At least one data processing unit 8, in the form of a processor and a data memory 9, is connected to the system bus. CPU 8 constitutes the bus master for the internal system bus. Gateway 1 according to the present invention contains two address buses separated from one another, namely a source address bus 6 and a destination address bus 7.

The CPU, as bus master, controls via internal control bus 5 a transfer of data in word-based fashion, via internal data bus 4, between two communication modules 2. In this context, CPU 8, as bus master, applies a source address via source address bus 6 to an internal transmitting first communication module 2, and a destination address via the separate destination address bus 7 to an internally receiving second communication module. If, for example, a data transfer is to be accomplished from first serial field bus 3-1 to second serial field bus 3-2, the data packets received at first serial bus 3-1 are converted by first communication module 2-1 into data words. These data words are transferred via internal data bus 4 from the source communication module 2-1 to the destination communication module 2-2, and assembled there into data packets that are transferred via second serial bus 3-2. The data transfer takes place directly via internal data bus 4, without buffering in CPU 8. The data transfer is merely controlled, via control bus 5, by CPU 8 as bus master. CPU 8 selects the transmitting communication module 2-1 by applying the corresponding source address to source address bus 6, and selects the receiving communication module 2-2 by applying a destination address to destination address bus 7.

FIG. 5 illustrates the data transfer of data from a first field bus 3-1 and a second field bus 3-2. CPU 8 selects communication module 2-1 by applying source address SA to internal source address bus 6, and selects second communication module 2-2 by applying a destination address DA to destination address bus 7. The data transfer of data words DW via internal data bus takes place directly, without buffering in CPU 8. The data transfer between the two communication modules 2-1, 2-2 occurs in a single bus transfer step.

In an embodiment of gateway 1 according to the present invention, the bus transfer occurs within a single clock cycle of the clock-timed CPU.

The use of two separate address buses 6, 7 makes possible a direct data transfer between two communication modules 2$i$, 2$j$ without buffering. Gateway 1 according to the present invention halves the latency time for a data transfer. A further advantage of gateway 1 according to the present invention is that bus utilization is likewise halved for a given number of data transfers, so that more bus reserves are available because of the lower bus utilization.

What is claimed is:

1. A gateway for data transfer between serial buses, comprising:
   multiple communication modules that are each provided for connection to a different serial bus, and that carry out a conversion between data packets (DP) and data words (DW);
   a bus master that, via an internal control bus, controls a word-based transfer of data via an internal data bus between two communication modules, wherein the bus master applies a source address (SA) via a source address bus to an internally transmitting first communication module, and a destination address (DA) via a separate destination address bus to an internally receiving second communication module; and
   data received in data packets (DP) by the first communication module via a first serial bus connected thereto being transferred from the first communication module directly without buffering outside the first and second communication modules, in word-based fashion in one or more data words, via the internal data bus to the second communication module, which transmits these transferred data, in data packets, via a second serial bus connected to the second communication module;
   wherein direct data transfer from the first communication module to the second communication module occurs within one clock cycle.

2. The gateway of claim 1, wherein the serial bus is a field bus.

3. The gateway of claim 1, wherein the serial bus is an Ethernet bus.

4. The gateway of claim 1, wherein the bus master is a processor.

5. The gateway of claim 1, wherein the bus master is a direct memory access (DMA) controller.

6. The gateway of claim 1, wherein the bus master is a finite state machine.

7. The gateway of claim 1, wherein actuators and sensors are respectively connected to the serial buses.

8. The gateway of claim 1, wherein the internal data bus includes multiple parallel data lines for transfer of a data word.

9. A method of operating a gateway for data transfer between serial buses, the method comprising:
   receiving a data packet with a first electronic processor of a first communication module provided for connection to a first external bus;
   converting, with the first electronic processor, the data packet to at least one data word;
   applying with a bus master electronic processor, a source address via a source address bus to the first communication module;
   applying with the bus master electronic process, a destination address via a separate destination address bus to the second communication module;
   performing a word-based data transfer from the first communication module to the second communication module without buffering the word-based data outside the first and second communication modules, wherein the performing is done using an internal data bus;

converting, with a second electronic process of the second communication module, the at least one data word to a second data packet; and transmitting the second data packet to a second external bus;

wherein direct data transfer from the first communication module to the second communication module occurs within one clock cycle.

10. The method of claim 9, wherein at least one external bus is a field bus.

11. The method of claim 9, wherein at least one external bus is an Ethernet bus.

12. The method of claim 9, wherein the bus master electric processor is a general purpose processor.

13. The method of claim 9, wherein the bus master electric processor is a direct memory access (DMA) controller.

14. The method of claim 9, wherein the bus master electric processor is a finite state machine.

15. The method of claim 9, wherein actuators and sensors are respectively connected to the external buses.

16. The method of claim 9, wherein the internal data bus includes multiple parallel data lines for transfer of a data word.

17. The method of claim 9, wherein the format of the first data packet is different than the format of the second data packet.

18. The method of claim 9, wherein at least one external bus is a field bus, wherein the bus master electric processor is a general purpose processor.

19. The method of claim 18, wherein actuators and sensors are respectively connected to the external buses, wherein the internal data bus includes multiple parallel data lines for transfer of a data word, and wherein the format of the first data packet is different than the format of the second data packet.

20. The method of claim 9, wherein at least one external bus is an Ethernet bus, wherein the bus master electric processor is a general purpose processor.

21. The method of claim 20, wherein actuators and sensors are respectively connected to the external buses, wherein the internal data bus includes multiple parallel data lines for transfer of a data word, and wherein the format of the first data packet is different than the format of the second data packet.

22. The method of claim 9, wherein at least one external bus is an Ethernet bus, wherein the bus master electric processor is a direct memory access (DMA) controller.

23. The method of claim 22, wherein actuators and sensors are respectively connected to the external buses, wherein the internal data bus includes multiple parallel data lines for transfer of a data word, and wherein the format of the first data packet is different than the format of the second data packet.

24. The method of claim 9, wherein at least one external bus is an Ethernet bus, wherein the bus master electric processor is a finite state machine.

25. The method of claim 24, wherein actuators and sensors are respectively connected to the external buses, wherein the internal data bus includes multiple parallel data lines for transfer of a data word, and wherein the format of the first data packet is different than the format of the second data packet.

26. The method of claim 9, wherein actuators and sensors are respectively connected to the external buses, wherein the internal data bus includes multiple parallel data lines for transfer of a data word, and wherein the format of the first data packet is different than the format of the second data packet.

27. The gateway of claim 1, wherein the serial bus is a field bus, wherein the bus master is a processor, wherein actuators and sensors are respectively connected to the serial buses, and wherein the internal data bus includes multiple parallel data lines for transfer of a data word.

28. The gateway of claim 1, wherein the serial bus is an Ethernet bus, wherein the bus master is a processor, wherein actuators and sensors are respectively connected to the serial buses, and wherein the internal data bus includes multiple parallel data lines for transfer of a data word.

29. The gateway of claim 1, wherein the serial bus is a field bus, wherein the bus master is a direct memory access (DMA) controller, wherein actuators and sensors are respectively connected to the serial buses, and wherein the internal data bus includes multiple parallel data lines for transfer of a data word.

30. The gateway of claim 1, wherein the serial bus is an Ethernet bus, wherein the bus master is a finite state machine, wherein actuators and sensors are respectively connected to the serial buses, and wherein the internal data bus includes multiple parallel data lines for transfer of a data word.

* * * * *

UNITED STATES PATENT AND TRADEMARK OFFICE
CERTIFICATE OF CORRECTION

PATENT NO.         : 8,571,044 B2                                              Page 1 of 1
APPLICATION NO.  : 12/227386
DATED              : October 29, 2013
INVENTOR(S)        : Ihle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this
Twenty-second Day of September, 2015

Michelle K. Lee
*Director of the United States Patent and Trademark Office*